May 1, 1962
C. E. GUTSHALL
3,032,089
LOCK WASHER
Filed May 7, 1959
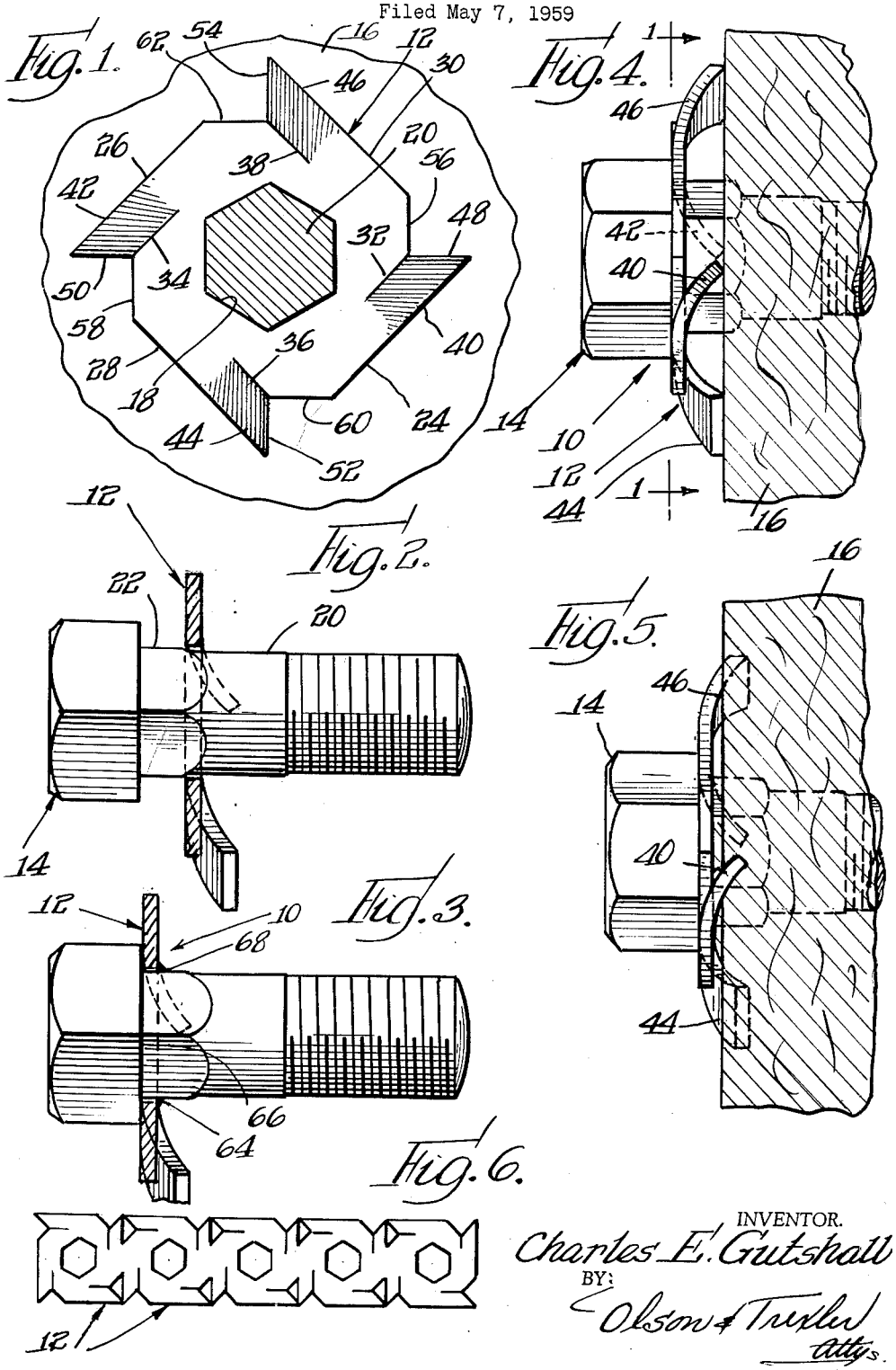
INVENTOR.
Charles E. Gutshall
BY:
Olson & Trexler
Attys.

United States Patent Office 3,032,089
Patented May 1, 1962

3,032,089
LOCK WASHER
Charles E. Gutshall, Elgin, Ill., assignor to Illinois Tool Works, Inc., a corporation of Delaware
Filed May 7, 1959, Ser. No. 811,618
3 Claims. (Cl. 151—35)

The present invention relates to a novel washer adapted to be used in conjunction with a rotary fastener such as a screw, nut or the like, and more particularly to a novel lock washer.

While numerous lock washers have been suggested heretofore and have been satisfactory for certain purposes, there are installations for which such prior lock washers are not entirely suitable. For example, in an installation where a workpiece against which the lock washer is to be clamped is made from a relatively soft material such as wood, the problems involved in obtaining the most effective locking action differ from those presented in installations where the lock washer is clamped against a relatively hard metal surface.

An important object of the present invention is to provide a novel washer adapted to be clamped between a rotary fastener and a relatively soft workpiece for obtaining improved locking action or resistance to retrograde rotation of the washer relative to the soft workpiece.

Another object of the present invention is to provide a novel lock washer of the above described type which is constructed so as to minimize waste of stock material.

Still another object of the present invention is to provide a novel lock washer of the above described type which is of simple and economical construction.

Other objects and advantages of the present invention will become apparent from the following description and the accompanying drawings wherein—

FIG. 1 is a sectional view taken along line 1—1 in FIG. 4;

FIG. 2 is a partial sectional view showing a lock washer involving the principles of the present invention in an intermediate state of assembly with a screw;

FIG. 3 is a sectional view similar to FIG. 2 but shows the lock washer and screw in permanent preassembled relationship;

FIG. 4 is a partial sectional view showing the lock washer and screw assembly applied to but not tightened against a workpiece;

FIG. 5 is a view similar to FIG. 4 but shows the lock washer tightened against and partially embedded in the workpiece; and FIG. 6 is a plan view showing the manner in which a plurality of lock washer blanks incorporating features of the present invention may be formed from a strip of stock material with little waste of stock material.

Referring now more specifically to the drawings, wherein like parts are designated by the same numerals throughout the various figures, an assembly 10 is shown which includes a lock washer 12 incorporating features of the present invention and a screw or bolt 14. Many uses for the assembly 10 will suggest themselves. However, one use for which the assembly 10 is especially adapted is the securing of appliances or machinery within wooden crates for shipping purposes. Thus, for the purpose of illustrating the present invention, the assembly 10 is shown applied to a wooden workpiece 16 in FIGS. 1, 4 and 5, which workpiece may be a part of a shipping crate.

As shown in the drawings, the washer 12 is provided with a polygonal body formed from suitable resilient sheet material, preferably steel. The washer body includes a central aperture 18 for accommodating a shank section 20 of the screw 14. In the embodiment shown for the purpose of illustrating the present invention, the washer and screw member are provided with complementary means for preventing relative rotation therebetween. More specifically, the shank section 20 includes a polygonal portion 22, and the aperture 18 is provided with a complementary polygonal configuration so that the straight edges defining the aperture 18 engage the straight sides of the shank portion 22 for resisting rotation between the washer and screw. It will be appreciated that in certain instances various other means may be provided for resisting relative rotation between the washer and screw.

As indicated in FIG. 6, a plurality of the washer bodies may be struck from a strip of stock material, and in order to minimize waste of the stock material, the washers are provided with a generally rectangular exterior configuration presenting pairs of opposite, straight and parallel side edges 24—26 and 28—30. As shown best in FIG. 1, a plurality of slits or severances 32, 34, 36 and 38 are formed in the washer body. These straight slits or severances are respectively associated with and parallel to the side edges 24, 26, 28 and 30, and the severances are disposed tangent to an imaginary circle concentric with the washer body and preferably having a diameter greater than the diameter of the central aperture 18. It will be noted that one end of the severance 32 extends to an opening in the side edge 30 while the opposite end of the severance 32 terminates well short of the side edge 28 opposite from the side edge 30 and preferably short of a plane parallel to the side edges 28 and 30 and intersecting the center of the washer body. Thus an edge of the severance 32 combines with its associated outer side edge 24 to define a substantially straight finger or prong 40 which is substantially tangent to the previously mentioned imaginary circle. The severances 34, 36 and 38 are formed in the same manner as the severance 32 and serve to define with associated side edges 26, 28 and 30 additional fingers or prongs 42, 44 and 46 which are identical to the prong 40. It is important to note, that the free terminal ends of the prongs are respectively defined by diagonal biting edges 48, 50, 52 and 54 which preferably extend along lines radiating from the center of the washer body member and intersecting corners of the generally rectangular figure provided by the washer body member. This arrangement provides advantages which will be discussed below. In order to facilitate economical production of the washer, the openings at the side edges of the washer body which are intersected by the severances may be in the form of generally V-shaped notches 56, 58, 60 and 62 since the diagonal terminal edges of the prongs may be formed simultaneously with the notches. In order to present the diagonal terminal edges 48—54 for engagement with the workpiece 16, the prongs are deflected downwardly or axially out of the plane of the central portion of the washer body. In addition, the prongs are preferably twisted about their longitudinal axes sufficiently so that their diagonal terminal edges are normally positioned substantially in a common plane spaced axially from the central portion of the washer body as shown, for example, in FIG. 4.

While the washer may be used for various purposes and in combination with many different rotary fasteners or screws, it is preferably associated in permanent preassembled relationship with the fastener. This may be accomplished by applying the finished washer to the screw as indicated in FIG. 2 and positioning the washer against the head of the screw as shown in FIG. 3 whereupon the screw may be staked as at 64, 66 and 68 for permanently retaining the washer.

The assembled washer and screw may be applied to the work structure in the usual manner. It will be noted that as the assembly is rotated in a forward direction so that the screw cooperating with suitable nut means or the like, not shown, will be tightened, the terminal edges of the prongs will slide relatively easy over the workpiece 16 without unduly marring the workpiece or resisting the tightening action. When the assembly is fully tightened, the terminal edges of the prongs will embed themselves in the relatively soft workpiece 16 in the manner shown in FIG. 5 and any tendency for retrograde rotation to occur will be effectively resisted. More specifically, it is to be noted that the transverse width of the prongs is substantially greater than the thickness of the sheet material and the diagonal arrangement of the terminal edges provide the edges with a length substantially greater than the width of the prongs so as substantially to increase the amount of engagement between the prongs and the workpiece for obtaining improved holding power. In addition, as the result of the above described construction and arrangement of the prongs and the diagonal terminal edges thereof, any tendency of the washer to loosen or rotate in a counterclockwise direction as viewed in FIG. 1 is resisted by forces applied perpendicularly to the radially extending or diagonal terminal edges of the prongs. In other words, these forces are applied to the prongs in directions which extend transversely of rather than parallel to the longitudinal axes of the prongs so that there is a tendency for the prongs to be twisted and deflected laterally outwardly in a manner which would cause lateral separation of the edges of the severances. As a result of their relatively wide transverse dimension, the prongs provide high resistance to such lateral deflection so as further to improve the holding power of the washer.

While the preferred embodiment of the present invention has been shown and described herein, many structural details may be changed without departing from the spirit and scope of the appended claims.

The invention is claimed as follows:

1. A lock washer formed from substantially flat stock material and having a polygonal outer periphery and a substantially planar body portion centrally apertured to receive a fastener element, the washer having a slit disposed inwardly of each outer edge and extending generally in the peripheral direction thereof to provide a cantilevering locking prong of substantial length, the free end of each locking prong being inclined from the open end of the adjacent slit outwardly to a substantial point constituting an outer peripheral corner of the washer between adjacent outer peripheral edges thereof, the inclined end of each locking prong presenting a biting edge of substantial length which is longer than the width of the adjacent body portion of the prong, the body of the washer adjacent each slit being relieved to present with the biting edge of an adjacent prong a notch outwardly opening from the open end of each slit, each prong being deflected in the same direction to project from the same side of the washer body with the prongs individually twisted about their respective center lines to position the biting edges in a plane substantially parallel to the plane of the washer body and with the said biting edges disposed substantially radially from the point of each prong toward the center of the washer body.

2. A lock washer as claimed in claim 1, wherein the outwardly opening notch is substantially V-shaped with the apex thereof at the open end of a corresponding slit.

3. A lock washer as claimed in claim 1, wherein the aperture through the body portion is non-circular adapting the washer to be non-rotatably associated with a screw.

References Cited in the file of this patent

UNITED STATES PATENTS

| | | |
|---|---|---|
| 904,937 | Clark | Nov. 24, 1908 |
| 1,323,188 | Humpres | Nov. 25, 1919 |
| 1,834,247 | Lillig | Dec. 1, 1931 |
| 2,102,495 | England | Dec. 14, 1937 |
| 2,396,588 | Luce | Mar. 12, 1946 |

FOREIGN PATENTS

| | | |
|---|---|---|
| 721,679 | Great Britain | Jan. 12, 1955 |